Figure 1:
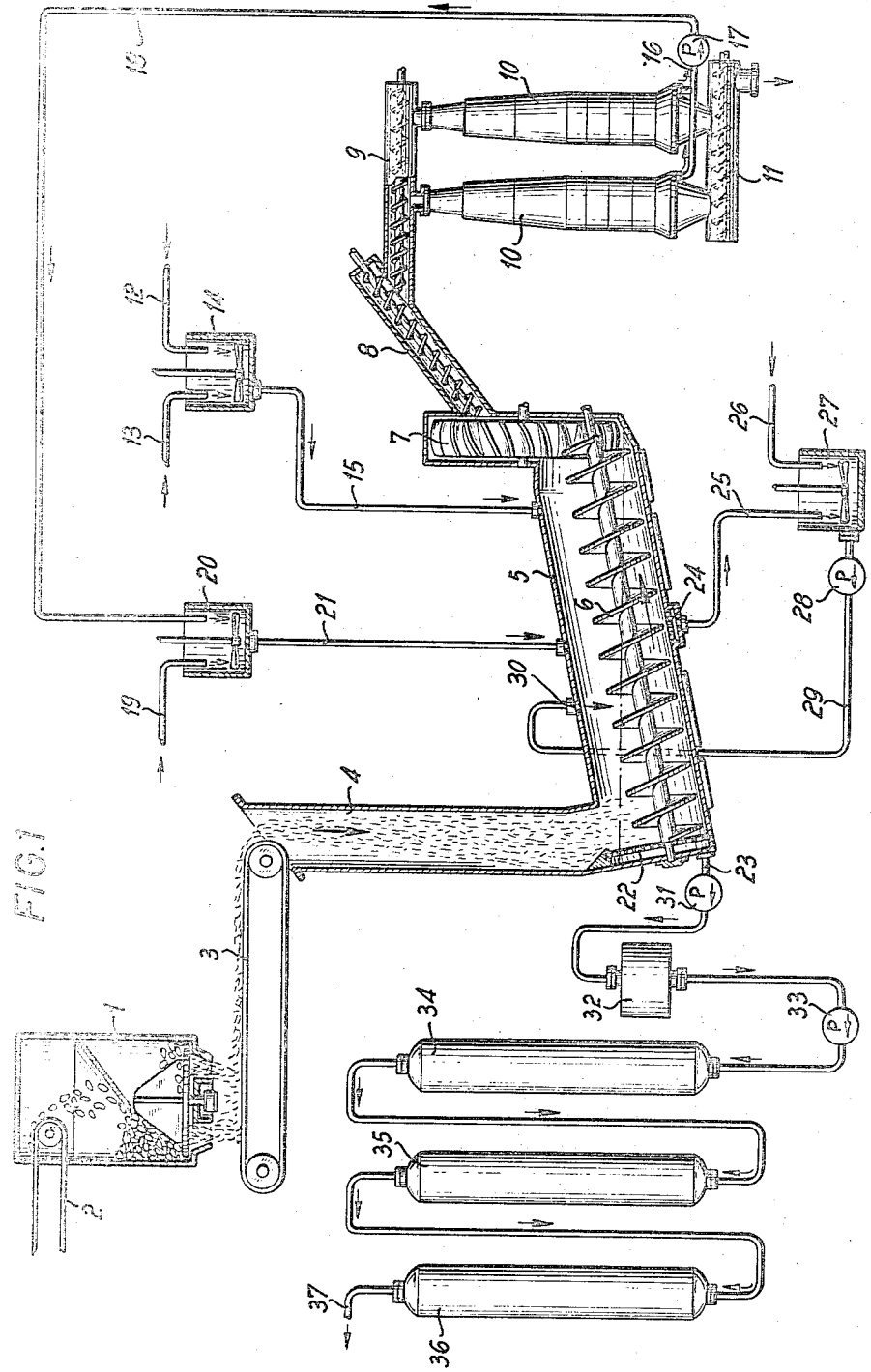

April 11, 1967 E. V. JUNG 3,313,653
PRODUCTION OF JUICE FROM SUGAR-CONTAINING PLANT MATERIAL
Filed Oct. 6, 1964 2 Sheets-Sheet 1

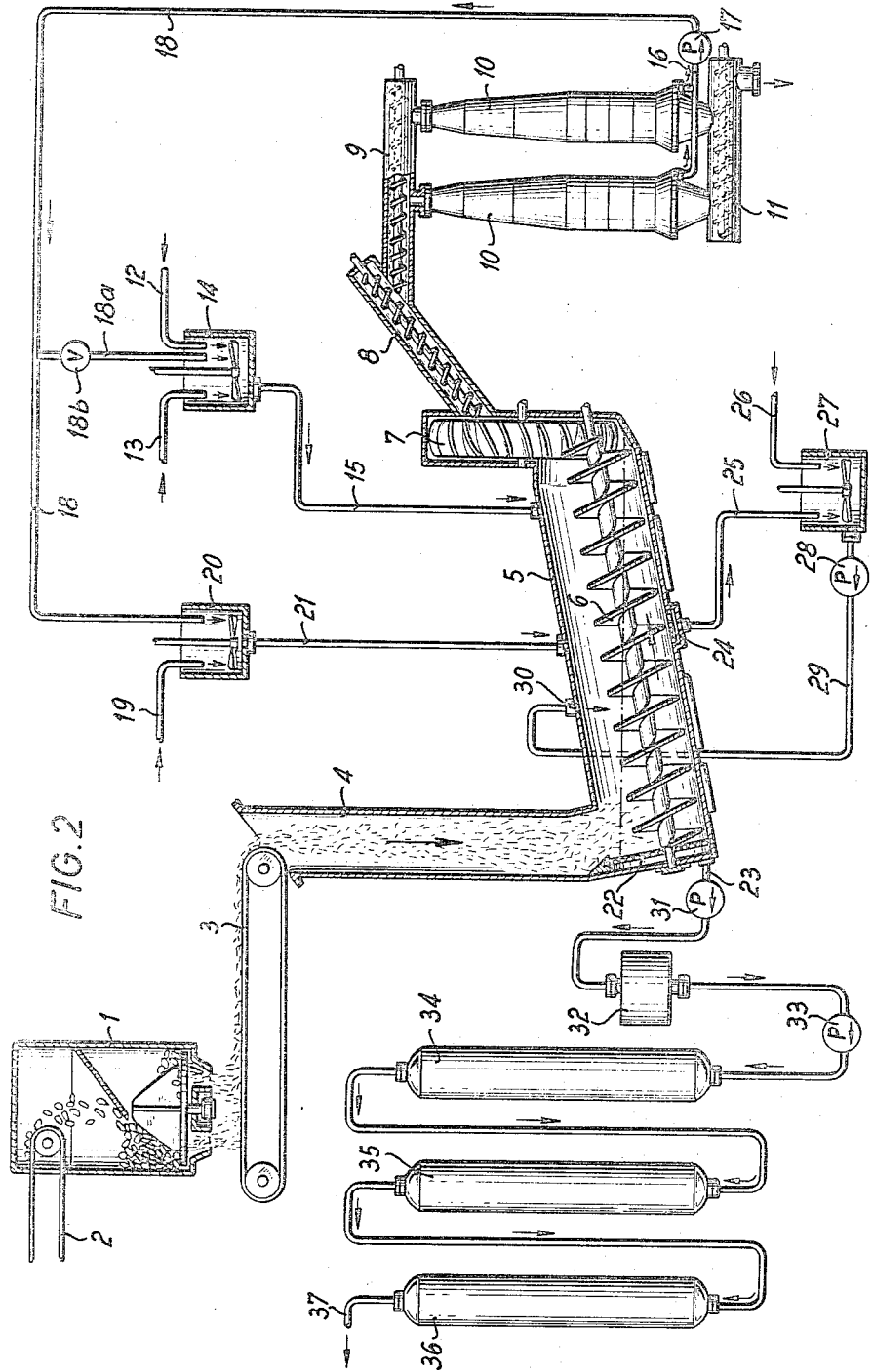

United States Patent Office 3,313,653
Patented Apr. 11, 1967

3,313,653
PRODUCTION OF JUICE FROM SUGAR-CONTAINING PLANT MATERIAL
Erland Viktor Jung, Landskrona, Sweden, assignor to Knapsack Aktiengesellschaft, a German corporation
Filed Oct. 6, 1964, Ser. No. 401,918
Claims priority, application Germany, Oct. 11, 1963, J 24,545
10 Claims. (Cl. 127—44)

The present invention provides a process for the production of juice from sugar-containing plant material, e.g. from sugar beet or sugar cane sliced or comminuted so as to form cosettes which hereinafter are collectively termed chips irrespective of origin. The juice is produced in an extractor by means of an extracting liquid consisting of make-up water and squeeze water. Proposals have already been made to admix the chips or juice with addends in an attempt to obviate the formation of a juice which besides sugar also contains relatively large proportions of nonsugar substances, e.g. pectins, proteins and soluble nitrogen compounds. But all these attempts substantially failed and the juice still included relatively large amounts of nonsugar substances. As a result thereof, the juice had to be subjected to complicated and expensive purifying treatment which may involve e.g. admixing the juice with lime, which is ultimately precipitated by adding carbon dioxide followed by filtration. The resulting filter cake consists of lime with considerable amounts of organic substance which generally cannot be utilized commercially.

The present invention now provides an improved process for the production of sugar, wherein the chips and/or the extracting liquid are admixed with polyphosphoric acid and/or dicarboxylic acid so as to conserve the initial stiffness of the chips even with high speed extraction and squeezing of the extracted chips liquor, and so as to obtain a juice with a content of nonsugar substances, such as pectins, proteins and soluble nitrogen compounds, low enough to permit economic treatment in an adsorption or ion exchange column without the juice being subjected to further purifying treatment.

The chips and/or extracting liquid should be admixed with 0.001 to 0.100% by weight polyphosphoric acid and/or with 0.005 to 0.04% by weight dicarboxylic acid, e.g. itaconic acid, the perecentages being referred in either case to the quantity of chips produced. The term polyphosphoric acid as used herein is understood to mean polyphosphoric acid containing at least 72.4% by weight $P_2O_5$, e.g. 76% by weight or 84% by weight $P_2O_5$. This type of polyphosphoric acid has e.g. the formula:

$$H(PO_3H_y)_xOH$$

wherein $x$ represents the number of the radicals

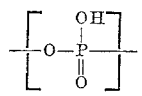

and Y represents the proportion of the H-atoms ionized in the $x$-radicals.

The polyphosphoric acid reacts directly with the chips and will bind a large portion of the pectins as well as substantially all of the proteins and the detrimental nitrogenous substances. With the nonsugar substances the polyphosphoric acid will form large molecule aggregates which will even increase in size in combination with itaconic acid. At the same time, a portion of the hydrogen ions represented by the letter $y$ in the above formula will be set free. The hydrogen ions set free flow together with the juice into the extractor, wherein they should be neutralized by adding a suitable hydroxide of a bivalent or polyvalent metal, e.g. calcium hydroxide, which should be used in a proportion corresponding to about half the polyphosphoric acid proportion, i.e. in a proportion of 0.0005 to 0.050% by weight. This is done in order to further fix the pectins in the chips.

The present invention also provides an apparatus for use in carrying out the above process, the apparatus comprising at least one slicing means for comminuting the beets or the like so as to obtain chips; an extractor receiving the chips coming from the slicing means through a conveyor means; means for supplying extracting liquid; one or more beet pulp squeezing means communicating with the extractor through a beet pulp conveying means; and advantageously at least one adsorption column, at least one cation exchanging means and at least one anion exchanging means which are fed with the sugar juice produced.

The special extraction method used in accordance with the process of the present invention yields a juice which contains but extremely small proportions of organic impurities and which is advantageously subjected to an after-treatment step in adsorption or ion exchange columns. The present invention thus also provides a process for further purification of the juice subsequent to the extracting step. To this effect, the juice is caused to flow through a plurality of means in the following order of succession; a filter means serving to remove mechanical impurities, such as mass particles; and adsorption column in which the juice is freed from coloring matter substantially of organic nature; and two ion exchange columns, i.e. a cation and an anion exchanger, so as to remove inorganic salts from the juice.

Characteristic of the apparatus of the present invention are more especially the allotted means serving to supply the chips and/or the extracting liquid with polyphosphoric acid and/or dicarboxylic acid.

Further embodiments and advantages of the present invention will become apparent on reading the accompanying drawings, wherein FIG. 1 represents an exemplary apparatus for carrying out the present process, and FIG. 2 represents a constructional modification of the apparatus shown in FIG. 1 for more advantageous use in a given case.

In FIG. 1, the reference numeral 1 pertains to a comminuting device, e.g. a slicing device, and 2 designates a belt conveyor supplying the comminuting device 1 with sugar-containing plant material. The plant material comminuted into small pieces, i.e. the chips fall onto a conveyor 3 conveying them to supply conduit 4 of extractor 5 in which screws 6 will transport the chips counter-currently to the extracting liquid to the discharge end of extractor 5 with bucket wheel 7 discharging the extracted chips and transporting them through screw conveyors 8 and 9 to the chips squeezing means 10.

After having been passed through the chips squeezing means 10, the dehydrated chips will fall down into a screw conveyor 11 conveying them to a drying installation (not shown in the drawing).

In FIG. 1, the extracting liquid consists of make-up water and squeeze water coming from the squeezing means 10. Reference numeral 12 denotes the place where the apparatus is fed with make-up water, which flows into a mixing vessel 14 to adjust a pH-value of about 5.8 by adding an ordinary acid, such as sulfuric acid, phosphoric acid, sulfurous acid or the like through pipe conduit 13. After the pH-adjustment, the make-up water is caused to travel through line 15 to extractor 5 in which screws 6 will stir the squeeze water admixed with an addend into the extracted chips. The squeeze water then flows through pipe conduit 16 from the chips squeezing means 10 to a pump 17 pumping it through pipe conduit 18 to a mixing vessel 20 having an allotted supply line 19 to admix the appropriate proportion of polyphosphoric acid and/or dicarboxylic acid, such as itaconic acid. The squeeze water admixed with the polyphosphoric acid and/or itaconic acid is then caused to flow from mixing vessel 20 through conduit 21 to extractor 5. In this conduit, the squeeze water should have a sugar content the same as the extracting liquid at the same place in the extractor.

Both the pH-adjusted make-up water and the squeeze water admixed with polyphosphoric acid and/or itaconic acid are caused to flow counter-currently to the chips in extractor 5 so as to extract sugar therefrom and so as to ultimately flow off the reactor through a sieve 22, disposed in the lower portion of extractor 5, and an allotted pipe 23. A suitable proportion of extracting liquid is removed through a sieve 24 disposed approximately in the center portion of extractor 5 and transported through line 25 to mixing vessel 27, in which the extracting liquid is admixed with a suitable proportion of calcium hydroxide so as to neutralize the hydrogen ions $y$ set free by the addition of polyphosphoric acid and/or itaconic acid. The neutralized extracting liquid is refluxed from mixing vessel 27 into extractor 5 by means of pump 28 and pipe conduit 29 extended into extractor 5 at point 30, and mixed with the chips in extractor 5.

The sugar-containing crude juice flowing off through line 23 disposed at the lower end of extractor 5 is conveyed by pump 31 to mechanical filter 32 serving to free the juice from mass particles, sand other mechanical impurities. After having been passed through filter 32, the crude juice is conveyed with the help of pump 33 to adsorption column 34 in which the juice is freed from organic coloring matter, and then to cation and anion exchangers 35 and 36, respectively, wherein the crude juice is freed from the bulk of molasses-forming salts. The purified thin juice leaving the anion exchanger through line 37 is transported without further treatment and in conventional manner to an evaporating means (not shown in the drawing) to be finally subjected to fractional crystallization.

In FIG. 2, the apparatus parts and plant details identical with those shown in FIG. 1 are defined by the same reference numerals as in FIG. 1. The plant shown in FIG. 2 differs from than shown in FIG. 1 in the feature that a valve 18a enables a determined portion of the squeeze water in pipe conduit 18 to be conveyed through pipe conduit 18a to the mixing vessel 14. The proportion of squeeze water added in the mixing vessel 14 should amount to 5–20% of the make-up water. A good buffer action is thus conferred upon the mixture of squeeze water and make-up water.

The plant shown in FIG. 2 also differs from that shown in FIG. 1 as regards operation. The mixture of squeeze and make-up water is admixed in mixing vessel 14 and through line 13 with a mixture of polyphosphoric acid and an ordinary acid, e.g. sulfuric acid, sulfurous acid or phosphoric acid. Line 19 serves exclusively to admix the squeeze water balance portion in mixing vessel 14 with itaconic acid.

The type of plant shown in FIG. 2 offers the advantage of permitting the use of very high-polymeric polyphosphoric acid which in the absence of the intermediary dissolving effect displayed by the strong ordinary acid would be viscous or solid. The application of appropriate proportions of polyphosphoric acid and ordinary acid enables the pH of the make-up water/squeeze water mixture and the phosphoric acid content of such buffered mixed water to be accurately adjusted at the same time.

In the following table there are compared the results which were obtained (a) in a pilot plant extractor with a capacity of 2000 tons per 24 hours at a discharge rate of 110% by weight and with the addition of 0.070% by weight polyphosphoric acid and 0.030% by weight itaconic acid in mixing vessel 20 and with the addition of 0.012% by weight hydrated lime in mixing vessel 27, the percentages being always referred to the amount of chips, and (b) with a plant operated under normal conditions, i.e. without any polyphosphoric acid, itaconic acid or hydrated lime addition.

TABLE 1

|  | Normal operation | With addends according to invention |
|---|---|---|
| Lime salts in thin juice, milligram/100 gram dry substance | 0.07 | 0.02 |
| Dry substance in compressed pulp, percent by weight | 18 | 35 |
| Protein and soluble nitrogen, percent by weight | 3–4 | ≈0 |
| Sugar lost, percent by weight related to beets | 0.7 | 0.3 |
| Relative turbidity | 1.00 | 0.25 |
| Pectin in crude juice, percent by weight | 0.800 | 0.013 |

Still further, the crude juice obtained in the plant operated in accordance with the present invention was considerably lighter in coloration than the crude juice obtained in the plant operated under normal conditions.

The plant operated in accordance with the present invention also offered the advantage that bacteria, especially thermophile and gas-producing bacteria, were substantially adsorbed by the polyphosphoric acid so that the extracting step could be carried out under substantially sterile conditions without sugar losses being involved, even without pretreatment of the sugar-containing plant material so as to remove or destroy the bacteria.

The relatively low content of potassium, sodium, calcium salts and organic acids in the thin juice results in further advantages which are associated with the plant operated in accordance with the present invention. It has been found, for example, that the evaporating plant could be operated for a relatively long period of time without incrustations being formed inside the evaporating pipes. Furthermore, extremely small quantities of molasses will be obtained. Still further, the plant of the present invention enabled higher sugar yields to be obtained which is very favorable from the commercial point of view.

It will be understood that the invention is by no way limited to the embodiments which are described above and shown in the accompanying drawings and which permit many modifications in details without departing from the scope of the present invention.

The process of the present invention for producing juice from sugar-containing plant material, such as sugar beets and sugar cane comminuted into chips, in an extractor with the use of an extracting liquid consisting e.g. of make-up water and squeeze water comprises more especially admixing the chips and/or the make-up water and/or the squeeze water with polyphosphoric acid and/or dicarboxylic acid so as to conserve the initial stiffness of the chips even with high speed extraction and squeezing of the extracted chips liquor and so as to obtain a juice with a content of non-sugar substances, such as pectins, proteins and soluble nitrogen compounds, low enough to permit economic juice treatment in an adsorption or ion exchange column without the juice being subjected to further purifying treatment.

The polyphosphoric acid employed should contain at least 72.4% by weight $P_2O_5$, and the dicarboxylic acid should be itaconic acid. The make-up water is adjusted so as to have a suitable pH-value by adding an ordinary acid, while the squeeze water is admixed with polyphosphoric acid and/or dicarboxylic acid. Alternatively, a mixture of an ordinary acid with polyphosphoric acid can be added to make-up water buffered with a small amount of squeeze water. Hydrogen ions set free during the treatment of the chips with polyphosphoric acid and/or dicarboxylic acid are neutralized by means of a base, such as a hydroxide of a bivalent or polyvalent metal, so as to further stabilize the pectinic substances in the chips. The chips and/or extracting liquid can be admixed with 0.001 to 0.100% by weight polyphosphoric acid and with 0.005 to 0.04% by weight itaconic acid as well as with 0.0005 to 0.0400% by weight calcium hydroxide, the percentages being referred to the quantity of chips. The crude juice coming from the extractor is ultimately treated without being subjected to a further purifying step in adsorption and ion exchange columns so as to remove organic coloring matter as well as salts and acids giving rise to incrustations or the formation of molasses.

The apparatus used for carrying out the present process comprises at least one slicing means for comminuting the beets or the like so as to obtain chips; an extractor receiving the chips coming from the slicing means through a conveyor means; means for supplying extracting liquid; one or more beet pulp squeezing means communicating with the extractor through a beet pulp conveying means; and advantageously at least one adsorption means, a cation exchanging means and an anion exchanging means which are fed with the sugar juice produced. The apparatus also comprises means for supplying the chips and/or the extracting liquid with polyphosphoric acid and/or dicarboxylic acid.

I claim:
1. In the process for the production of juice from starting material including a sugar containing plant material comminuted into chips and an acid extracting liquid, the improvement which comprises adding at least one member selected from the group consisting of polyphosphoric acid and polyphosphoric acid in combination with a dicarboxylic acid to said starting material.

2. A process as claimed in claim 1, wherein the pH-value of the extracting liquid is adjusted to a value of about 5.8 by admixing said extracting liquid with a mineral acid.

3. A process as claimed in claim 1, wherein the sugar-containing plant material is at least one member selected from the group consisting of sugar beets and sugar cane.

4. A process as claimed in claim 1, wherein the polyphosphoric acid has a $P_2O_5$-content of at least 72.4% by weight.

5. A process as claimed in claim 1, wherein the dicarboxylic acid is itaconic acid.

6. A process as claimed in claim 1, wherein crude juice coming from an extracting stage without being subjected to further purification is treated in an adsorption and ion exchange column, respectively, so as to remove organic coloring matter, salts and acids giving rise to incrustations and the formation of molasses.

7. A process as claimed in claim 1, wherein hydrogen ions set free during the treatment of the chips with the member selected from the group consisting of polyphosphoric acid and polyphosphoric acid in combination with a dicarboxylic acid are neutralized by adding a base so as to further stabilize pectinic substances appearing in the chips.

8. A process as claimed in claim 7, wherein the chips and the extracting liquid, respectively, are admixed with 0.001 to 0.100% by weight polyphosphoric acid, with 0.005 to 0.040% by weight itaconic acid and with 0.0005 to 0.0400% by weight calcium hydroxide, the percentages being related to the quantity of chips.

9. A process as claimed in claim 7, wherein the base is a hydroxide respectively of a bivalent and a polyvalent metal.

10. A process as claimed in claim 9, wherein the base is hydrated lime.

References Cited by the Examiner
UNITED STATES PATENTS

| | | | |
|---|---|---|---|
| 847,126 | 3/1907 | Steffen | 127—4 X |
| 950,035 | 2/1910 | Weinrich | 127—44 |
| 2,602,761 | 7/1952 | Hildebrandt | 127—7 |

OTHER REFERENCES

McGinnis: Beet-Sugar Technology, 1951, Reinhold Publishing Corp., New York, pp. 140, 141, 167, 283–286 and 289–293 relied on.

MORRIS O. WOLK, *Primary Examiner.*

MICHAEL E. ROGERS, *Examiner.*